Dec. 12, 1967  S. G. JACKSON  3,357,061
CONDITIONING HOPPER
Filed July 26, 1965  3 Sheets-Sheet 1

INVENTOR
SAMUEL G. JACKSON
BY
ATTORNEY

INVENTOR
SAMUEL G. JACKSON
BY
ATTORNEY

Dec. 12, 1967  S. G. JACKSON  3,357,061
CONDITIONING HOPPER

Filed July 26, 1965  3 Sheets-Sheet 3

INVENTOR
SAMUEL G. JACKSON
BY
ATTORNEY

United States Patent Office 3,357,061
Patented Dec. 12, 1967

3,357,061
CONDITIONING HOPPER
Samuel G. Jackson, 2518 Erskine Road,
Lubbock, Tex. 79403
Filed July 26, 1965, Ser. No. 474,630
3 Claims. (Cl. 19—66)

ABSTRACT OF THE DISCLOSURE

Humid air is blown through a hopper of lightly placed seed cotton to increase the moisture content thereof for better ginning.

---

This invention relates to processing seed cotton and more particularly to moisture conditioning the cotton before being ginned.

In the processing of seed cotton it is recognized as desirable to have different moisture levels in the cotton for different processes. It is desirable to reduce the humidity of raw cotton received from the farm to about 3% or 4% moisture for the cleaning processes. It is desirable then to increase the moisture content to about 8% for the ginning process.

Previously in commercial practice the moisture changes have been carried on when the cotton is widely separated. Typically the seed cotton is blown through special drying equipment or special humidifying equipment so that during the moisture changing process one lock or particle of cotton is not in contact with another (or if so only accidentally). Other previous commercial embodiments condition the seed cotton by blowing conditioned air through a cleaning machine. E.g., the feeder-cleaners which are located immediately above the gin stands often have conditioned air blow through them. Here also the seed cotton is separated in locks and not placed together.

According to this invention the seed cotton is lightly packed in a hopper at the time of its humidity conditioning. In this manner the cotton can be exposed to the conditioned air for a longer period of time. With use of a commercial embodiment of this invention, the cotton can be exposed to the moistening air for about 20 seconds, whereas by previous conditioners it could be exposed for only approximately 5 seconds. Also by blowing the air through a mass or bed of seed cotton the air more intimately contacts the cotton than when the cotton is widely separated in which case that the contact of the cotton with the air is around the periphery or outer layers of each lock or bolt.

An object of this invention is to change the moisture content of seed cotton.

Another object of this invention is to change the moisture content of seed cotton as completely as possible eliminating uneven moisture content through the locks of cotton.

Another object of this invention is to expose the seed cotton to the conditioned air for a long time thereby eliminating the problem of using excessively wet conditioning air or excessively hot conditioning air which has undesirable effects upon the seed cotton.

Another object of this invention is to adjust the moisture content of seed cotton by exposing it to conditioned air which is neither excessively hot nor excessively humid.

Another object of this invention is to achieve the above without adding excessively to the machinery, the power, or the space required in existing cotton gin plants.

A further object is to achieve the above with a trouble free unit that is almost impossible to choke up.

Still further objects are to achieve the above with a device that is sturdy, compact, durable, simple, and reliable, yet inexpensive and easy to manufacture.

Still further objects are to achieve the above with a method that is rapid, inexpensive, and does not require skilled people to adjust and operate.

The specific nature of the invention as well as other objects, uses, and advantages thereof will clearly appear from the following description and from the accompanying drawings, the different views of which are not to the same scale, in which.

Figure 1:
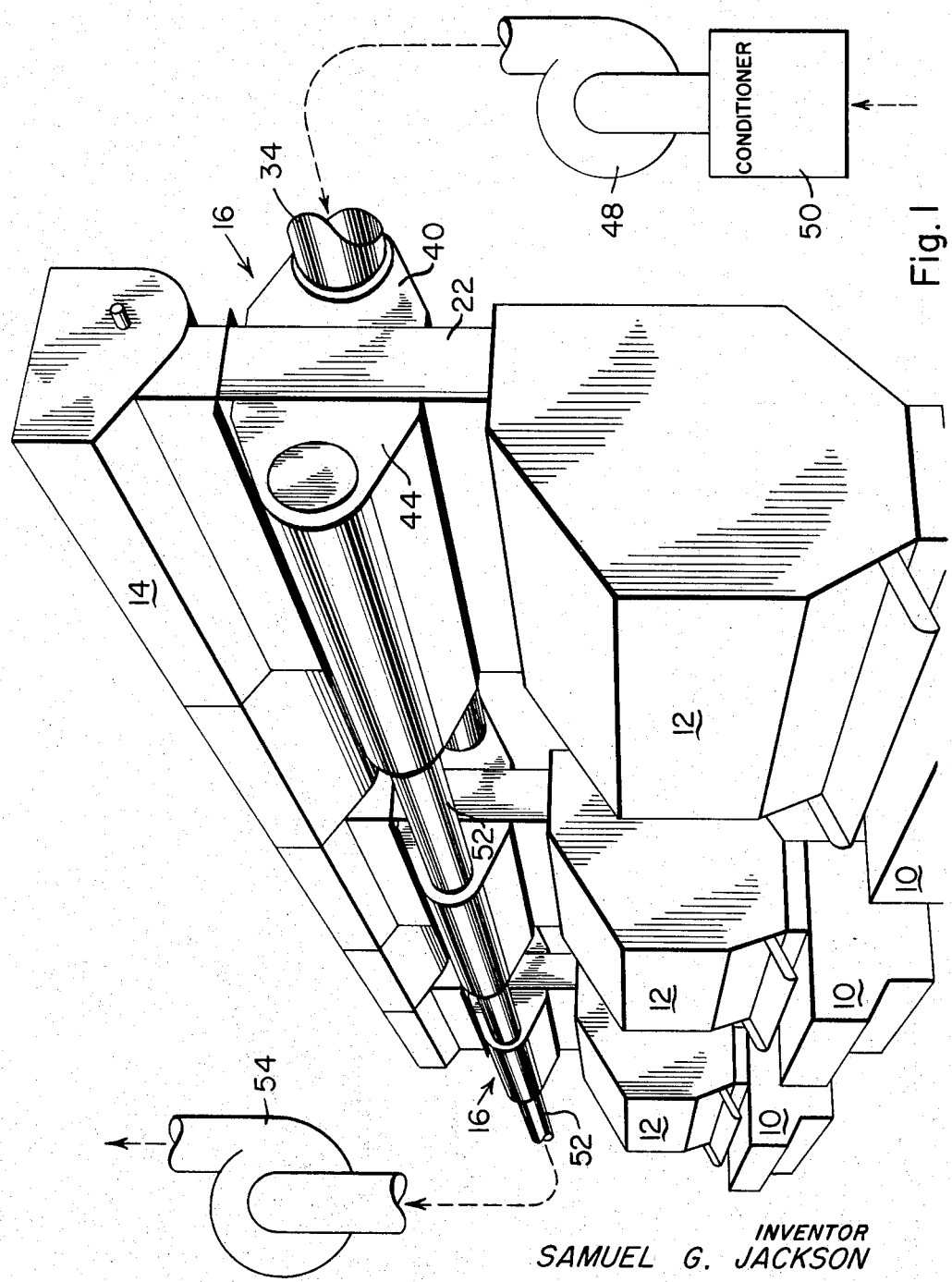
FIG. 1 is a perspective view of a portion of a gin showing my improved hopper therein, with parts shown schematically.

Reference is made more particularly to FIG. 1 of the drawings which represents at least a portion of a cotton gin plant, including a battery of gin stands 10. Each gin stand has feeder-cleaner 12 located immediately over it. Cotton is distributed to the feeder-cleaners by conveyor 14. In conventional plants other machinery cleans the seed cotton before introduction into the conveyor 14.

This invention is particularly concerned with hopper 16 between the conveyor 14 and each of the feeder-cleaners 12.

Figure 2:
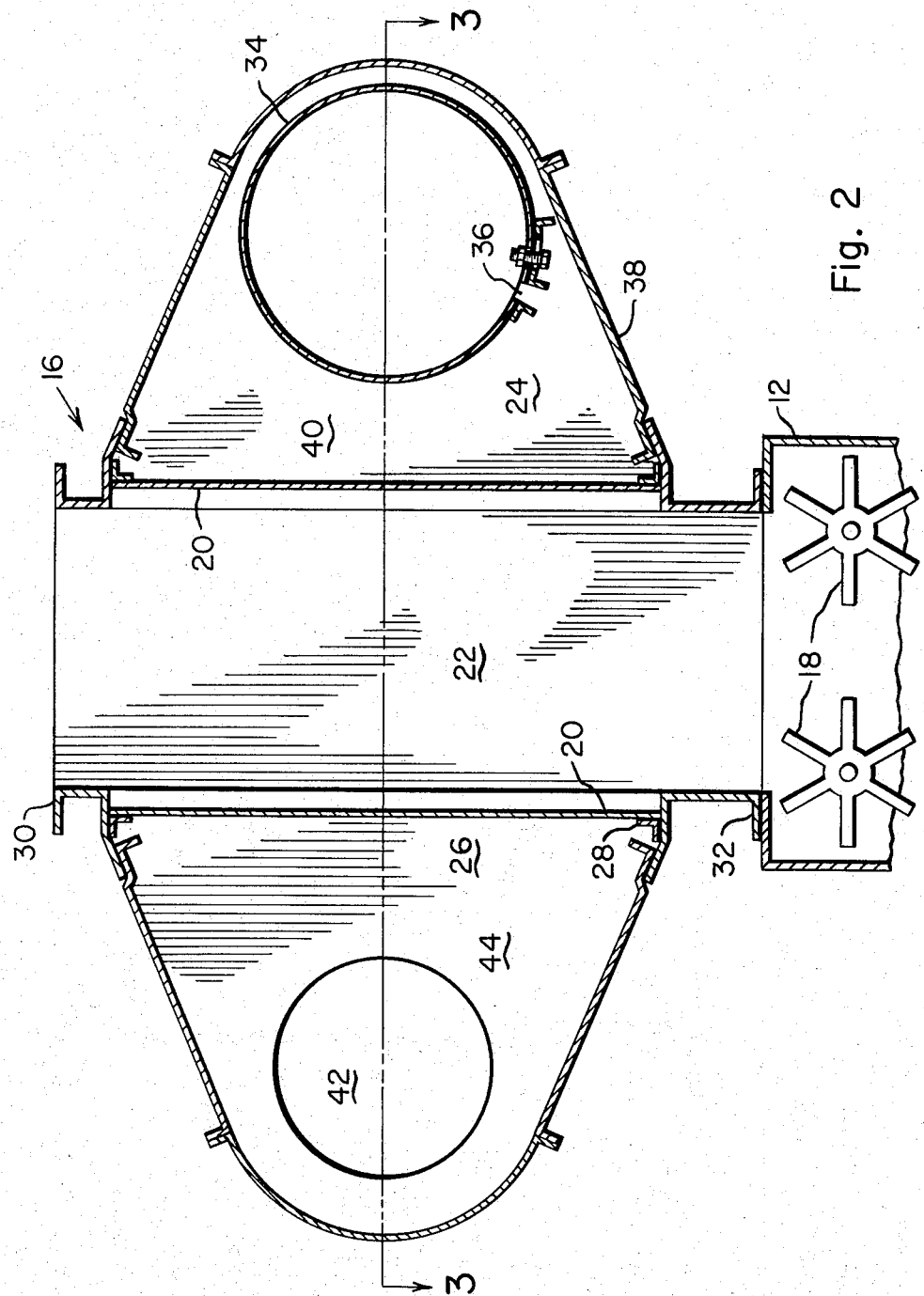
FIG. 2 is a sectional view of the hopper with a portion of the feeder cleaner below it.

In the conventional gin plant in commercial practice today, hoppers (which the hoppers 16 replace) perform the function of providing a ready supply of cotton to the feeder-cleaners 12. The feeder-cleaners 12 remove the seed cotton from the hopper by feeder rolls 18 (FIG. 2) permitting it to fall by gravity into each feeder-cleaner wherein the cotton receives the last cleaning before it is fed at a predetermined rate into the gin stand 12. The rate at which the seed cotton is fed by the feeder rolls 18 to the feeder-cleaner 12 and into the gin stand 10 is determined by the operator according to a plurality of parameters, well known to skilled operators.

In combination the hopper 16 will have the conveyor 14 above it which forms a means for keeping the hopper full of unpacked seed cotton. The conveyor 14 may be either a belt type conveyor or an auger type conveyor but in any event if the hopper 16 is not full of seed cotton the conveyor will add more cotton to the top of the hopper. Also the feeder rolls 18 in the feeder-cleaner 12 form a portion of the means for removing seed cotton from the bottom of the hopper at a continuous desired rate. Thus the seed cotton within the hopper 16 is formed into a vetrical slab of seed cotton being confined by side walls 20 of the hopper.

Figure 3:
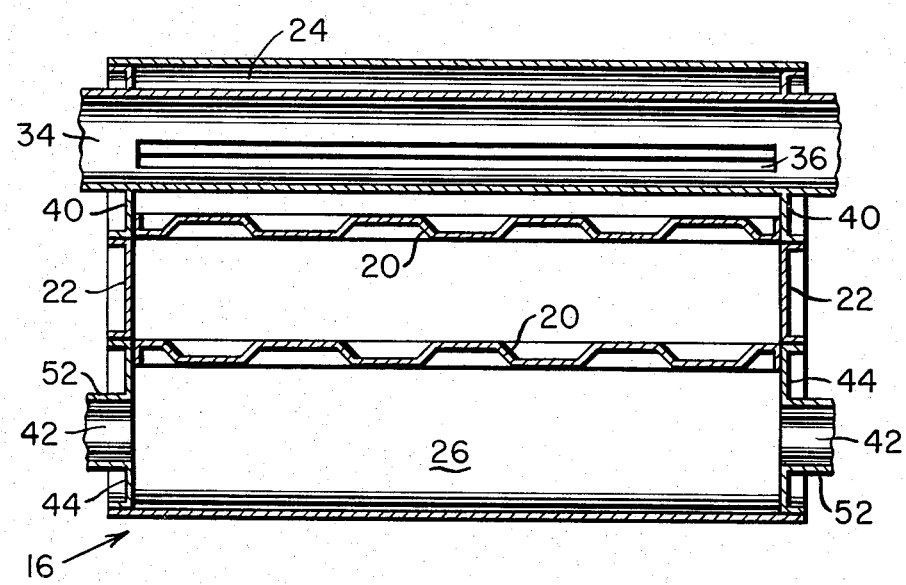
FIG. 3 is a sectional view of the hopper taken on line 3—3 of FIG. 2.

Referring more particularly to the hopper 16 (FIGS. 2 and 3), it is generally in the form of a parallel pipe with air duct or chambers 24 and 26 on each side. The hopper is constructed with parallel vertical sidewalls 20 and parallel vertical endwalls 22. The sidewalls 20 are several times the length of the endwalls 22, therefore, the slab of cotton which is formed within the hopper is several times wider than it is thick.

Figure 4:
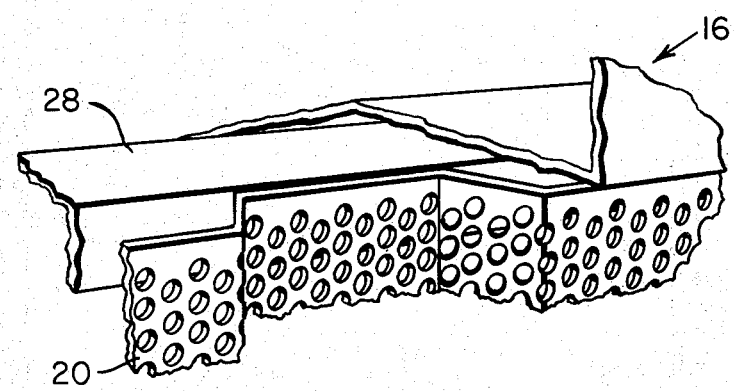
FIG. 4 is a partial perspective view of a portion of the hopper showing a part of an air permeable side wall.

Referring more particularly to the sidewalls 20 (FIGS. 3 and 4) it will be noted that they are corrugated vertically for strength. The sidewalls are pervious to air but impervious to seed cotton. I have had good success using metal plate material with ⅛ inch round holes, ³⁄₁₆ inch on center. The corrugations are flat about 3 inches in width and about ½ inch deep. It is necessary there be ample availability for air flow through walls 20 without inhibiting the downward passage of cotton by gravity. The sidewalls are reinforced by angle irons 28 at the top and bottom. The endwalls 22 are formed of flat sheet metal. Flange 30 at the upper side and flange 32 at the lower side of the hopper 16 form reinforcement and means for attaching the hopper to the conveyor 14 above and the feeder-cleaner 12 below.

The inlet chamber 24 is located on one side of one of the sidewalls 20. The inlet chamber has a pipe 34 extending therethrough. The pipe has an adjustable longitudinal slot 36 to the inlet chamber 24 as will be explained later. Door 38 in the bottom wall of the chamber 24 provides access to the slot for adjusting it. The pipe 34 opens through ends 40 of the inlet chamber. The outlet chamber 26 has flanged opening 42 on either of its ends 44 for attaching suction pipe 52 thereto.

With the hoppers 16 completely installed, the inlet pipes 34 are connected with connecting pipes to a source of conditioned air. Schematically the source has been shown by fan 48 pulling the air from conditioner 50. The air would be warmed and humidity added to it in the conditioner 50 so that as the air was forced through the slab of cotton within the hopper 16 it would increase the humidity of the cotton leaving the hopper to about 8%.

The outlet air chambers 26 are connected by connecting suction pipes 52 to suction fan 54. The suction fan 54 and blowing fan 48 are adjusted so that the pressure in the inlet air chamber 24 is approximately equal to the suction in the outlet air chamber 26. Thus the center of the slab of cotton within the hopper 16 is at atmospheric pressure. Therefore there is a reduced tendency to by-pass the slab of cotton with the conditioned air and also there is a reduced tendency to blow the cotton out of the hopper by pressure or retain it in the hopper by suction.

The pressure within the pipe 34 is greater than the pressure within the inlet air chamber 24. Therefore the amount of air which flows through each hopper 16 is governed largely by the size of the slot 36. If under certain operating conditions there is no cotton in one of the hoppers there will not be a great excess of air passing through that hopper than through the others but still the system as a whole will be operable.

Although they have not been described it will be understood that other access doors, inspection plates, windows, etc. are provided as is conventional in seed cotton processing equipment. Also it will be understood the feeder and hopper may be combined in one structure and located anywhere in the gin plant.

Although this invention has been illustrated and described as having a vertical opening for the passage of seed cotton, the air permeable sides 20 may be inclined to an extent which will not impede the passage of seed cotton. If this is done, it is desirable to pass the air upwardly through the slab of seed cotton to facilitate its passage through the hopper.

It will be apparent that the embodiment shown is only exemplary and that various modifications can be made in construction, materials, and arrangement within the scope of the invention as defined in the appended claims.

I claim as my invention:
1. In a cotton gin having
   (a) a battery of gin stands,
   (b) a feeder for each gin stand above each gin stand, and
   (c) a conveyor above the feeders for conveying and distributing seed cotton to said feeders;
   (d) an improved hopper above each feeder and below the conveyor comprising in combination with the above:
   (e) two air permeable walls,
   (f) means for passing humid air through the permeable walls and through the seed cotton in the hopper,
   (g) an inlet air chamber on one side of the hopper,
   (h) an outlet air chamber on the other side of the hopper, and
   (j) an air pipe extending through the inlet chamber,
   (k) said pipe having an adjustable air slot between the air pipe and air chamber to regulate the amount of air passing from the air pipe to the air chamber.

2. An improved hopper adapted to be mounted in a cotton gin above a feeder which is mounted above one of a battery of gin stands and further adapted to be mounted below a conveyor for conveying and distributing cotton to each of said gin stands through said hopper and feeder comprising in combination: two upstanding endwalls which are air impermeable; and two upstanding air permeable; seed cotton impermeable sidewalls; an inlet air chamber connected to one of said sidewalls; an outlet air chamber connected to one of said sidewalls; an air pipe extending through the inlet air chamber; the air pipe having a slot in the air pipe within the air chamber; and means for adjusting the opening of said slot thereby regulating the amount of air which passes from the air pipe into the air chamber.

3. In a cotton gin having
   (a) a battery of gin stands,
   (b) a feeder for each gin stand immediately above each gin stand, and
   (c) a conveyor above the feeders for conveying and distributing seed cotton to said feeder;
   (d) an improved hopper above each feeder and below the conveyor comprising in combination with the above:
   (e) two upstanding end walls,
   (f) two upstanding sidewalls which are air permeable,
   (g) said conveyor forming a means for keeping the hopper full of unpacked seed cotton,
   (h) said feeder forming a means for removing seed cotton from the bottom of the hopper at a desired flow rate,
   (j) an inlet air chamber attached to one of said air permeable sidewalls,
   (k) an outlet air chamber connected to the other of said air permeable sidewalls,
   (m) the distance between the end walls being several times the distance between the sidewalls,
   (n) an air pipe extending through said inlet air chamber,
   (o) the air pipe having a slot in said air pipe within said air chamber,
   (p) means for adjusting the width of said slot thereby adjusting the amount of air passing through the air slot,
   (q) means for forcing conditioned air into said air pipe, and
   (r) means for sucking air from said outlet air chamber.

References Cited

UNITED STATES PATENTS

| | | | |
|---|---|---|---|
| 2,764,013 | 9/1956 | Harrell | 19—66 |
| 2,981,985 | 5/1961 | Walsh et al. | 19—66 |
| 1,954,383 | 4/1934 | Herring | 19—66 |
| 2,129,630 | 9/1938 | Streun | 19—27 |

MERVIN STEIN, *Primary Examiner.*

I. C. WADDEY, *Assistant Examiner.*